(12) United States Patent
Brennetot et al.

(10) Patent No.: US 9,488,206 B2
(45) Date of Patent: Nov. 8, 2016

(54) RIVET

(71) Applicant: ALCOA INC., Pittsburgh, PA (US)

(72) Inventors: Thomas Brennetot, Conflans Sainte Honorine (FR); Arnoldo Gutierrez, Tucson, AZ (US); Gilbert Lee, Tucson, AZ (US); Gerhart Hufnagl, Tucson, AZ (US); Randy Torrence, Tucson, AZ (US)

(73) Assignee: Alcoa Inc., Pittsburgh, PA (US)

( * ) Notice: Subject to any disclaimer, the term of this patent is extended or adjusted under 35 U.S.C. 154(b) by 200 days.

(21) Appl. No.: 14/482,792

(22) Filed: Sep. 10, 2014

(65) Prior Publication Data

US 2015/0078856 A1    Mar. 19, 2015

Related U.S. Application Data

(60) Provisional application No. 61/879,859, filed on Sep. 19, 2013.

(51) Int. Cl.
*F16B 13/04*    (2006.01)
*F16B 19/10*    (2006.01)
*F16B 19/05*    (2006.01)
*B21J 15/02*    (2006.01)

(52) U.S. Cl.
CPC .......... *F16B 19/1054* (2013.01); *B21J 15/022* (2013.01); *F16B 19/05* (2013.01)

(58) Field of Classification Search
CPC .... F16B 19/1054; F16B 19/05; B21J 15/022
USPC ..................................... 411/34, 43
See application file for complete search history.

(56) References Cited

U.S. PATENT DOCUMENTS

| 2,061,629 A | * | 11/1936 | Huck | ................. F16B 19/1054 |
| | | | | 29/511 |
| 3,288,016 A | * | 11/1966 | Reynolds | ............ F16B 19/1054 |
| | | | | 411/34 |
| 3,459,447 A | | 8/1969 | Hurd et al. | |

(Continued)

FOREIGN PATENT DOCUMENTS

| CN | 101153623 A | 4/2008 |
| CN | 102734292 A | 10/2012 |

(Continued)

OTHER PUBLICATIONS

International Search Report and Written Opinion dated Dec. 19, 2014, issued by ISA/US, in International (PCT) Application No. PCT/US2014/054995, filed Sep. 10, 2014 (7 pages).

(Continued)

*Primary Examiner* — Gary Estremsky
(74) *Attorney, Agent, or Firm* — Greenberg Traurig, LLP (57) ABSTRACT

A rivet includes a pin member having a head and a lock groove, and a lock ring having a flange. The flange of the lock ring is swaged into the lock groove of the pin member and transformed to a bead that engages the lock groove, and a portion of an outer surface of the lock ring deforms and is rotated inwardly. The rivet is installed within a structure such that the head of the pin member is flush with an outer surface of a panel and the portion of the outer surface of the lock ring is flush with an outer surface of another panel. The pin member includes a frangible portion that breaks off when the rivet is installed.

8 Claims, 6 Drawing Sheets

(56) References Cited

U.S. PATENT DOCUMENTS

| | | | | |
|---|---|---|---|---|
| 3,460,429 | A | * | 8/1969 | La Torre ............. F16B 19/1054 29/509 |
| 4,002,099 | A | * | 1/1977 | Bradley ............. F16B 19/1054 411/70 |
| 4,112,811 | A | * | 9/1978 | King ....................... F16B 19/05 29/243.522 |
| 4,221,041 | A | | 9/1980 | Hufnagl et al. |
| 4,254,809 | A | | 3/1981 | Schuster |
| 4,405,273 | A | * | 9/1983 | Ruhl ................... F16B 19/1072 411/43 |
| 4,765,010 | A | * | 8/1988 | Jeal ..................... F16B 19/1054 470/11 |
| 4,826,372 | A | | 5/1989 | Kendall |
| 5,006,024 | A | * | 4/1991 | Siebol ................ F16B 19/1054 411/43 |
| 5,049,016 | A | | 9/1991 | Nordyke |
| 5,346,348 | A | * | 9/1994 | Denham ............. F16B 19/1054 411/43 |
| 5,429,464 | A | * | 7/1995 | Eshraghi ............ F16B 19/1054 411/43 |
| 6,325,582 | B1 | | 12/2001 | Sadri |
| 6,551,040 | B1 | * | 4/2003 | Terry .................. F16B 19/1072 411/43 |
| 6,659,699 | B2 | | 12/2003 | Stoewer et al. |
| 8,029,220 | B2 | * | 10/2011 | David ................. F16B 19/1036 411/34 |
| 2011/0058916 | A1 | | 3/2011 | Toosky |
| 2013/0202382 | A1 | | 8/2013 | Corbett |

FOREIGN PATENT DOCUMENTS

| | | |
|---|---|---|
| CN | 103244532 A | 8/2013 |
| CN | 204113841 U | 1/2015 |
| FR | 2 914 966 | 4/2007 |
| GB | 766137 | 1/1957 |
| GB | 2227538 | 1/1990 |
| WO | 86/06447 A2 | 11/1986 |
| WO | 2008/142311 A1 | 11/2008 |

OTHER PUBLICATIONS

"Rivet—Countersunk", Airbus Industrie Standards Manual, ABS0056, Issue 4, pp. 1-8 (Feb. 1996).

* cited by examiner

FIG. 10 ary pdf# RIVET

CROSS-REFERENCE TO RELATED APPLICATION

This application is a Section 111(a) application relating to and claiming the benefit of commonly owned, U.S. Provisional Patent Application Ser. No. 61/879,859 entitled "RIVET," filed Sep. 19, 2013, the entirety of which is incorporated by reference herein.

FIELD OF THE INVENTION

The present invention relates to a fastener and, more particularly, a rivet for securing a plurality of work pieces together.

BACKGROUND OF THE INVENTION

Rivets are used to fasten a plurality of work pieces to one another. As an example, in the aerospace industry, trailing edge areas of control surfaces, such as ailerons, flaps, elevators, and rudders, are fastened with small, semi-tubular or solid rivets.

SUMMARY OF THE INVENTION

In an embodiment, a rivet includes a pin member including an elongated shank having a first end, a second end opposite the first end, a lock groove located proximate to the first end, a frangible portion, and a break neck groove located intermediate the lock groove and the frangible portion, and a head located at the first end; and a lock ring having a first end, a second end opposite the first end of the lock ring, an aperture extending from the first end of the lock ring to the second end of the lock ring, an outer surface extending from the first end of the lock ring to the second end of the lock ring, and a flange located at the second end of the lock ring, wherein the lock ring is installed on the pin member proximate to the first end of the pin member such that the flange of the lock ring is aligned with the lock groove of the pin member, wherein the lock ring is adapted to be secured to the pin member such that the flange of the lock ring is swaged into the lock groove of the pin member and transformed to a bead that engages the lock groove, and a portion of the outer surface of the lock ring proximate to the first end of the lock ring deforms and is rotated inwardly. In an embodiment, the lock groove of the pin member is annular. In an embodiment, the lock groove has an hourglass shape. In an embodiment, the pin member includes a first smooth cylindrical portion and a second smooth cylindrical portion, and wherein the lock groove of the pin member is located intermediate the first smooth cylindrical portion and the second smooth cylindrical portion. In an embodiment, the frangible portion includes a pull portion having pull grooves. In an embodiment, the frangible portion includes a third smooth cylindrical portion, a fourth smooth cylindrical portion, and a transition portion intermediate the third and fourth smooth cylindrical portions.

In an embodiment, the rivet is adapted to be installed within a structure, wherein the structure includes a first panel having an outer surface, an inner surface, and a first hole extending from the outer surface of the first panel to the inner surface of the first panel, and a second panel juxtaposed with the first panel and having an outer surface, an inner surface, and a second hole extending from the outer surface of the second panel to the inner surface of the second panel and aligned with the first hole, wherein the rivet is adapted to be installed within the first and second holes in an installed position, and wherein when the rivet is in its installed position, a surface of the head of the pin member is flush with the outer surface of the second panel and the portion of the outer surface of the lock ring is flush with the outer surface of the first panel. In an embodiment, when the rivet is in its installed position, the frangible portion of the pin member is broken off from the pin member at the breakneck groove, forming an exposed surface on the second smooth cylindrical portion, and wherein the exposed surface is aligned with the outer surface of the first panel. In an embodiment, the head of the pin member is a countersink head, and the second hole is a countersink hole.

BRIEF DESCRIPTION OF THE DRAWINGS

Reference is made to the following detailed description of the embodiments considered in conjunction with the accompanying drawings, in which.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION OF THE DRAWINGS

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which can normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in an embodiment," "in some embodiments," and the like as used herein do not necessarily refer to the same embodiment(s), though it may. Furthermore, the phrases "in an embodiment," "in some other embodiments" and the like as used herein do not necessarily refer to a different embodiment, although it may. Thus, as described below, various embodiments of the invention may be readily combined, without departing from the scope or spirit of the invention.

Figure 1:
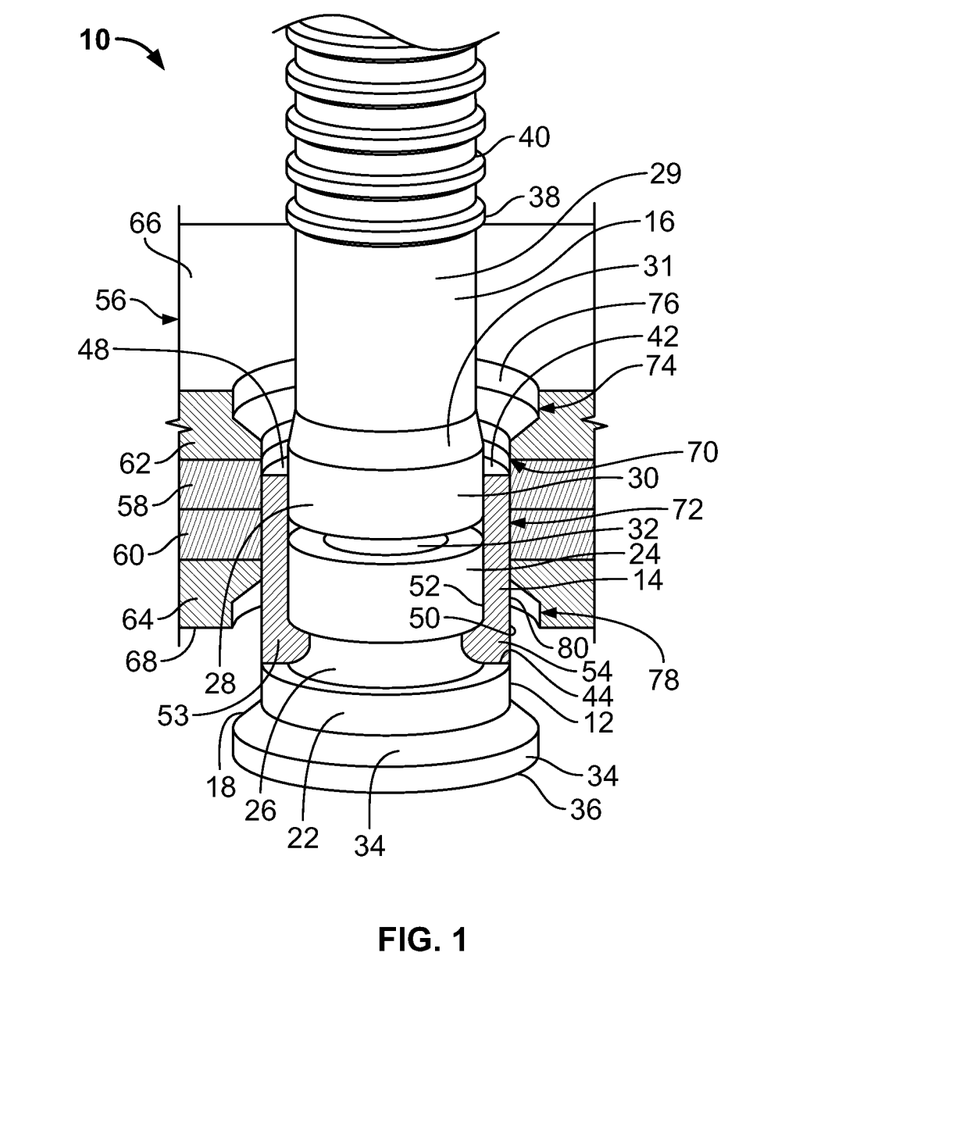
FIG. 1 is a perspective view of a rivet in accordance with an embodiment, with a lock ring employed by the rivet shown in cross-section, and the rivet being positioned within a structure.
Figure 2:
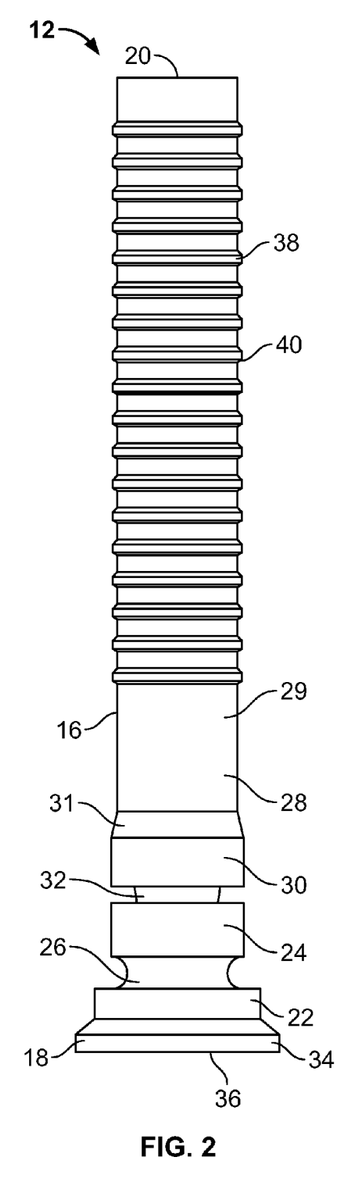
FIG. 2 is a side elevational view of a pin member employed by the rivet shown in FIG. 1.

FIG. 1 illustrates an embodiment of a rivet 10. In an embodiment, the rivet 10 includes a pin member 12 and a lock ring 14 that is sized and shaped to engage the pin member 12. Referring to FIGS. 1 and 2, in an embodiment, the pin member 12 includes an elongated shank 16 having a first end 18, a second end 20 opposite the first end 18, a first smooth cylindrical portion 22 located proximate to the first end 18, a second smooth cylindrical portion 24 located intermediate the first and second ends 18 20, and an annular lock groove 26 intermediate the first smooth cylindrical portion 22 and the second smooth cylindrical portion 24. In an embodiment, the lock groove 26 has an hourglass shape. In other embodiments, the lock groove 26 can consist of other shapes and sizes. In an embodiment, a diameter of the lock groove 26 is smaller than a diameter of the first smooth cylindrical portion 22 and a diameter of the second smooth cylindrical portion 24. In an embodiment, the pin member 12 includes a frangible portion 28 having third and fourth smooth cylindrical portions 29, 30 and a transition portion 31 intermediate the third and fourth smooth cylindrical portions 29, 30. In an embodiment, an annular breakneck groove 32 is positioned intermediate the transition portion 31 and the second smooth cylindrical portion 24. In an embodiment, the pin member 12 includes a head 34 positioned at the first end 18 thereof. In an embodiment, the head 34 is a countersunk-shaped head. In an embodiment, the head 34 includes a flat surface 36. In another embodiment, the head 34 is a protruding head. In an embodiment, the frangible portion 28 of the pin member 12 includes a pull portion 38 positioned at the second end 20 thereof and having a plurality of annular pull grooves 40 that are adapted to be engaged by a puller of a fastener installation tool. In an embodiment, the pin member 12 is made from a high-strength titanium alloy. In an embodiment, the pin member 12 is made from beta-C titanium. In other embodiments, the pin member 12 is made from other titanium alloys, such as Ti 6-4 or Ti 555 titanium alloys, or other suitable metallic materials.

Figure 3:
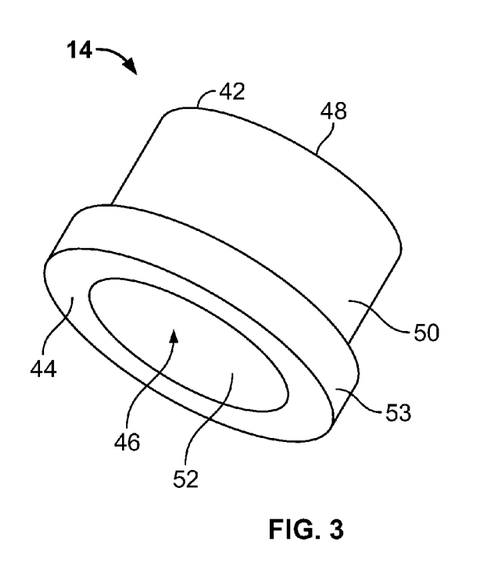
FIG. 3 is a perspective view of the lock ring employed by the rivet shown in FIG. 1.
Figure 4:
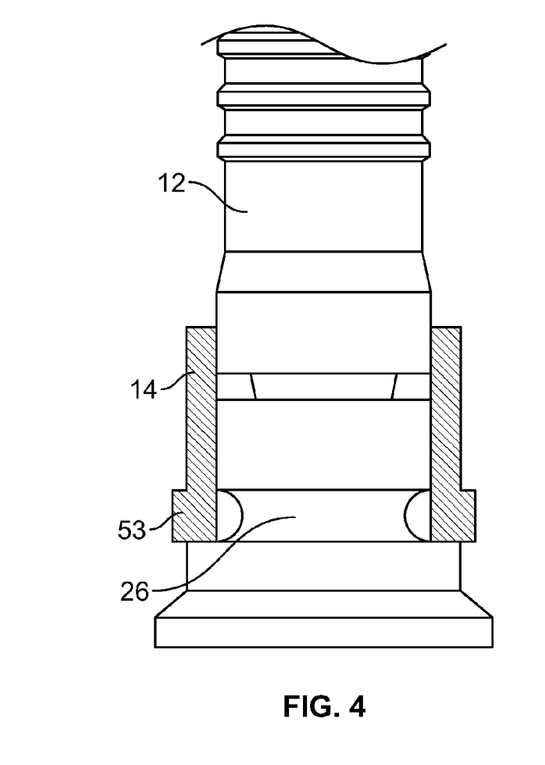
FIG. 4 is a side elevational view of the pin member and lock ring shown in FIGS. 2 and 3, respectively, and which are engaged with one another prior to swaging of the lock ring to the pin member.
Figure 5:
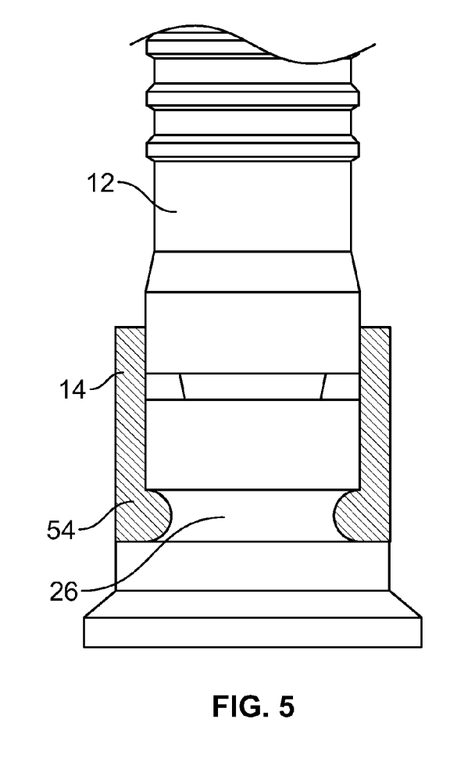
FIG. 5 is a side elevational view of the pin member and lock ring shown in FIG. 4 with the lock ring swaged onto the pin member.

With reference to FIGS. 1 and 3, in an embodiment, the lock ring 14 includes a first end 42, a second end 44 opposite the first end 42, an aperture 46 that extends from the first end 42 to the second end 44, a surface 48 located at the first end 42, an outer surface 50 extending from the first end 42 to the second end 44, and an inner surface 52 extending from the first end 42 to an outwardly extending annular flange 53 located at the second end 44. In an embodiment, the lock ring 14 is made from a low strength titanium alloy. In an embodiment, the lock ring 14 is made from CP titanium. In another embodiment, the lock ring 14 is made from MONEL® nickel alloy. In another embodiment, the lock ring 14 is made from A286 stainless steel. In another embodiment, the lock ring 14 is made from shaped wire and wrapped around the pin member 12. With reference to FIGS. 4 and 5, in an embodiment, the lock ring 14 is installed on the pin member 12 and the flange 53 is swaged or rolled into the lock groove 26 of the pin member 12, forming an inwardly extending annular bead 54. In an embodiment, the annular bead 54 of the lock ring 14 engages the lock groove 26 of the pin member 12 and secures the lock ring 14 to the pin member 12.

Referring back to FIG. 1, in an embodiment, the rivet 10 is adapted to be installed within a structure 56 containing a plurality of work pieces. In an embodiment, the work pieces include an first panel 58, a second panel 60 juxtaposed with the first panel 58, a first strip 62 juxtaposed with and attached to the first panel 58, and a second strip 64 juxtaposed with and attached to the second panel 60. In an embodiment, the first strip 62 includes an outer surface 66, while the second strip 64 includes an outer surface 68. In an embodiment, each of the first and second panels 58, 60 includes a hole 70, 72, respectively, while the first strip 62 includes a hole 74 having a countersunk portion 76 within the outer surface 66, and the second strip 64 includes a hole 78 having a countersunk portion 80 within the outer surface 68. In an embodiment, the holes 70, 72 and the holes 74, 78 are aligned with one another. In certain embodiments, the first and second panels 58, 60 and the first and second strips 62, 64 are made of aluminum, an aluminum alloy, other metallic alloys, composites, or combinations thereof. In other embodiments, the first and second strips 62, 64 need not be included in the structure 56.

With reference to FIG. 1, in an embodiment, the lock ring 14 is received by the pin member 12 by insertion of the elongated shank 16 of the pin member 12 through the aperture 46 of the lock ring 14. In an embodiment, the lock ring 14 is positioned on the first cylindrical smooth portion 22 and around the second smooth cylindrical portion 24 and the fourth cylindrical smooth portion 30. In an embodiment, as described above, the bead 54 of the lock ring 14 engages the lock groove 26 of the pin member 12 in order to secure the pin member 12 and the lock ring 14 to one another.

Figure 6:
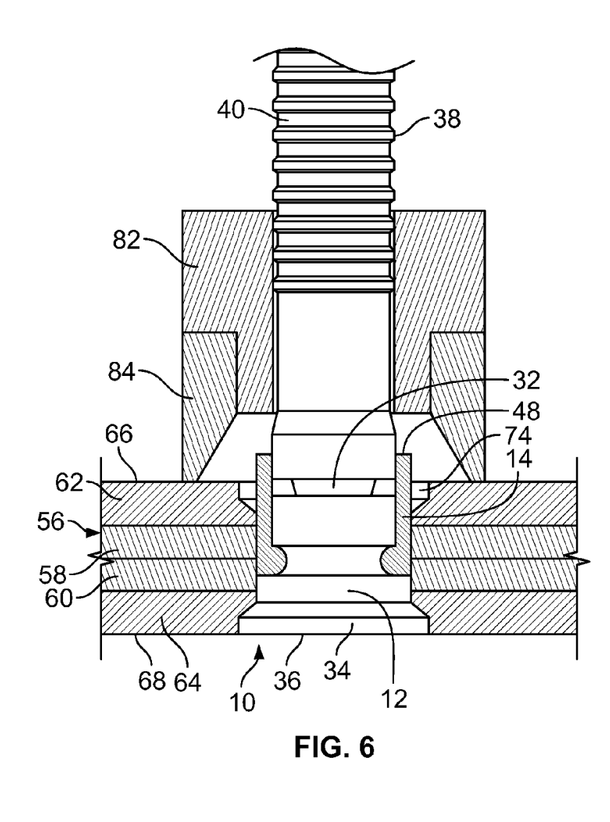
FIG. 6 is a side elevational view of the rivet shown in FIG. 1 and being engaged by a fastener installation tool.
Figure 7:
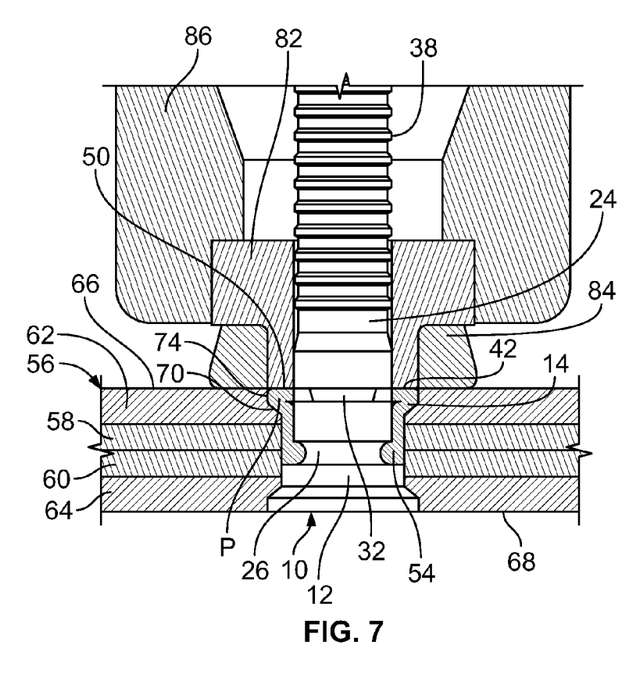
FIG. 7 is a side elevational view of the rivet shown in FIG. 6 with the lock ring being further swaged by the fastener installation tool.

In an embodiment, the rivet 10 is inserted through the holes 70, 72 of the first and second panels 58, 60 and the holes 74, 78 of the first and second strips 62, 64, and the head 34 of the pin member 12 is received within the countersunk portion 80 of the hole 78 of the second strip 64, and at least a portion of the elongated shank 16 of the pin member 12 projects outwardly from the first strip 62. With reference to FIG. 6, a fastener installation tool includes a swaging anvil 82 and a collet (not shown in the Figures). In an embodiment, a spring member 84 is positioned between the anvil 82 and the first strip 62. In an embodiment, the spring member 84 is made of rubber. In an embodiment, the collet engages the pull grooves 40 of the pull portion 38 of the pin member 12 (not shown in the Figures) to apply an axial force thereon and pull the rivet 10 into the structure 56 until the surface 36 of the head 34 is flush (or substantially flush) with the outer surface 68 of the second strip 64. With reference to FIG. 7, the swage anvil 82, housed within a tool housing 86, engages the lock ring 14 and applies an axial force on the surface 48 thereof to commence further swaging of the lock ring 14 to the pin member 12. As shown in FIG. 7, in an embodiment, the spring member 84 is compressed by the anvil 82 and the first strip 62. In this regard, the spring member 84 is pushed against the first strip 62 and reacts to the load provided on the structure to facilitate closing the sheet gap between the panels 58, 60. In an embodiment, the spring member 84 generates pre-load.

With continued reference to FIG. 7, the swaging process continues until a portion of the lock ring 14 proximate to the first end 42 thereof deforms into the countersunk portion 76 of the hole 74 of the first strip 62 and the hole 70 of the first panel 58, and a portion P of the outer surface 50 proximate to the first end 42 deforms and rotates inwardly until the portion P is flush (or substantially flush) with the outer surface 66 of the first strip 62. In an embodiment, the breakneck groove 32 is aligned (or substantially aligned) with the outer surface 66 of the first strip 62. In an embodiment, the bead 54 of the lock ring 14 maintains its engagement with the lock groove 26 of the pin member 12, thereby securing the rivet 10 to the structure 56.

Figure 8:
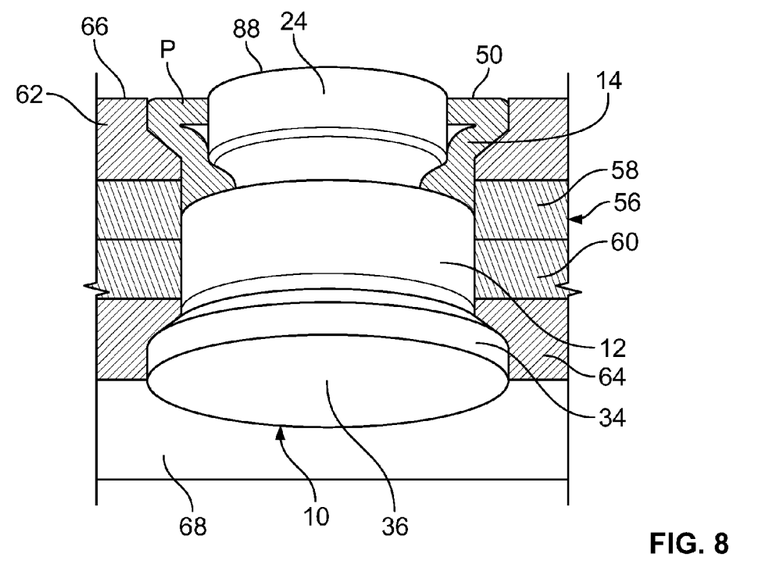
FIG. 8 is a bottom perspective view of the rivet shown in FIG. 7 within its installed position.
Figure 9:
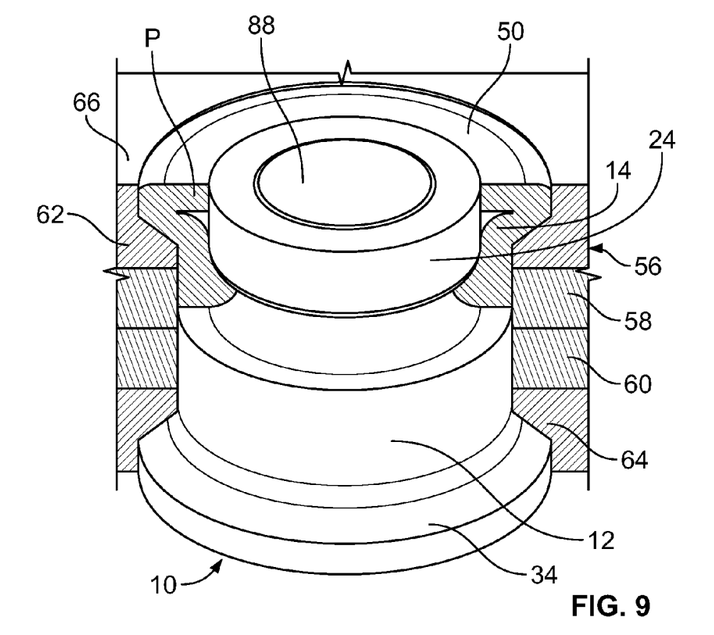
FIG. 9 is a top perspective view of the rivet shown in FIG. 8.
Figure 10:
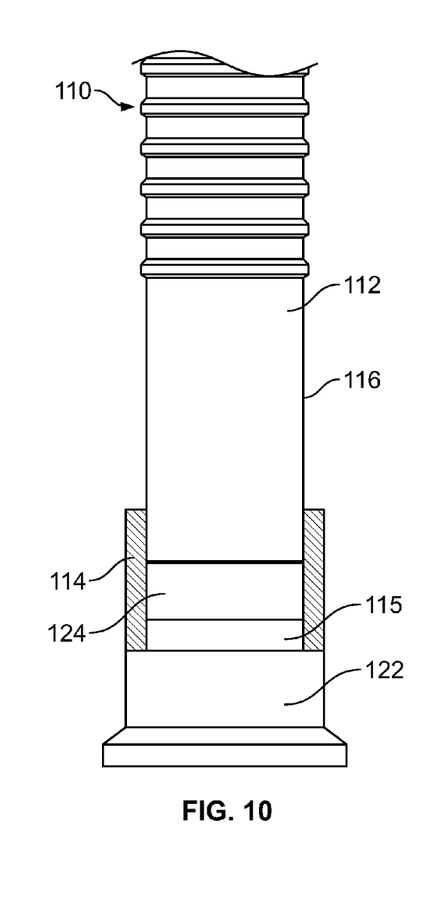
FIG. 10 is a side elevational view of a rivet in accordance with another embodiment, with a lock ring employed by the rivet shown in cross-section.
Figure 11:
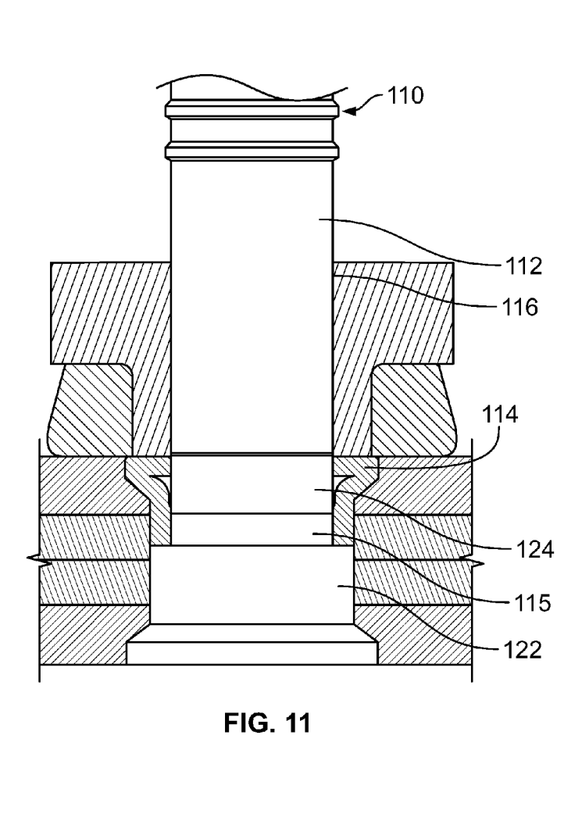
FIG. 11 is a side elevational view of the rivet shown in FIG. 10 positioned within a structure, with the lock ring being swaged by a fastener installation tool.

When the lock ring 14 is fully swaged, the fastener installation tool continues to apply a pulling force on the pull portion 38 of the pin member 12 (not shown) until the pull portion 38 and the frangible portion 28 separates from the remainder of the pin member 12 at the breakneck groove 32. As shown in FIGS. 8 and 9, the surface 36 of the head 34 of the pin member 12 is flush (or substantially flush) with the outer surface 68 of the second strip 64, while the portion P of the surface 50 of the lock ring 14 and a newly formed pin break fracture surface 88 of the pin member 12 (i.e., at the former location of the breakneck groove 32 proximate to the second smooth cylindrical portion 24) are flush (or substantially flush) with the outer surface 66 of the first strip 62. Accordingly, the rivet 10 is double flush on opposite sides of the structure 56. FIGS. 10 and 11 show another embodiment of a rivet 110 having a pin member 112 and a lock ring 114. The rivet 110 is constructed and functions similar to the rivet 10 with certain differences. That is, in an embodiment, an elongated shank 116 of the pin member 112 includes a first smooth cylindrical portion 122 and a second smooth cylindrical portion 124, but does not include a lock groove therebetween, nor does the lock ring include a corresponding annular bead. Instead, the lock ring 114 is secured to the second smooth cylindrical portion 124 by an annular weld 115.

It should be understood that the embodiments described herein are merely exemplary and that a person skilled in the art may make many variations and modifications without departing from the spirit and scope of the invention. In an embodiment, the rivets 10, 110 are used in aerospace applications. In another embodiment, the rivets 10, 110 are used in industrial applications. In an embodiment, the structure 56 may include only two work pieces, i.e., the first and second panels 58, 60. In other embodiments, the structure 56 may incorporate any number of work pieces. All such variations and modifications are intended to be included within the scope of the invention as defined in the appended claims.

What is claimed is:

1. A rivet, comprising:
a pin member including an elongated shank having a first end, a second end opposite the first end, a head located at the first end, a first smooth cylindrical portion adjacent to the head, a second smooth cylindrical portion, a lock groove located proximate to the first end and intermediate the first and second smooth cylindrical portions and spaced from the head by the first smooth cylindrical portion, a frangible portion, and a break neck groove located intermediate the second smooth cylindrical portion and the frangible portion; and a lock ring having a first end, a second end opposite the first end of the lock ring, an aperture extending from the first end of the lock ring to the second end of the lock ring, flange located at the second end of the lock ring, and an outer surface of consistent diameter extending from the first end of the lock ring to the flange, wherein the lock ring is installed on the pin member proximate to the first end of the pin member such that the flange of the lock ring is adjacent the first smooth cylindrical portion, spaced from the head of the pin member by the first smooth cylindrical portion and aligned with the lock groove of the pin member, wherein the lock ring is adapted to be secured to the pin member such that the flange of the lock ring is swaged into the lock groove of the pin member and transformed to a bead that engages the lock groove, and a portion of the outer surface of the lock ring proximate to the first end of the lock ring deforms and is rotated inwardly.

2. The rivet of claim 1, wherein the lock groove of the pin member is annular.

3. The rivet of claim 2, wherein the lock groove has an hourglass shape.

4. The rivet of claim 3, wherein the frangible portion includes a pull portion having pull grooves.

5. The rivet of claim 4, wherein the frangible portion includes a third smooth cylindrical portion, a fourth smooth cylindrical portion, and a transition portion intermediate the third and fourth smooth cylindrical portions.

6. The rivet of claim 1, wherein the rivet is adapted to be installed within a structure, wherein the structure includes a first panel having an outer surface, an inner surface, and a first hole extending from the outer surface of the first panel to the inner surface of the first panel, and a second panel juxtaposed with the first panel and having an outer surface, an inner surface, and a second hole extending from the outer surface of the second panel to the inner surface of the second panel and aligned with the first hole, wherein the rivet is adapted to be installed within the first and second holes in an installed position, and wherein when the rivet is in its installed position, a surface of the head of the pin member is flush with the outer surface of the second panel and the portion of the outer surface of the lock ring is flush with the outer surface of the first panel.

7. The rivet of claim 6, wherein when the rivet is in its installed position, the frangible portion of the pin member is broken off from the pin member at the breakneck groove, forming an exposed surface on the second smooth cylindrical portion, and wherein the exposed surface is aligned with the outer surface of the first panel.

8. The rivet of claim 7, wherein the head of the pin member is a countersink head adapted to be received in the second hole which is a countersink hole.

* * * * *

UNITED STATES PATENT AND TRADEMARK OFFICE
CERTIFICATE OF CORRECTION

Page 1 of 1

PATENT NO. : 9,488,206 B2
APPLICATION NO. : 14/482792
DATED : November 8, 2016
INVENTOR(S) : Thomas Brennetot et al.

It is certified that error appears in the above-identified patent and that said Letters Patent is hereby corrected as shown below:

In the Specification

Column 1, Line 7, delete "commonly owned," and insert --commonly owned, co-pending--.

Column 3, Line 33, delete "18 20," and insert --18, 20,--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*